(12) United States Patent
Collins et al.

(10) Patent No.: US 9,548,891 B2
(45) Date of Patent: Jan. 17, 2017

(54) CONFIGURATION OF NETWORK DEVICES

(71) Applicant: 1E Limited, London (GB)

(72) Inventors: Amelia Sophie Collins, London (GB); Magdalene Balenger, London (GB); Peter Major, London (GB)

(73) Assignee: 1E LIMITED, London (GB)

( * ) Notice: Subject to any disclaimer, the term of this patent is extended or adjusted under 35 U.S.C. 154(b) by 0 days.

(21) Appl. No.: 14/527,510

(22) Filed: Oct. 29, 2014

(65) Prior Publication Data

US 2015/0121485 A1  Apr. 30, 2015

(30) Foreign Application Priority Data

Oct. 30, 2013 (GB) .................................. 1319182.0

(51) Int. Cl.
| | |
|---|---|
| *H04L 29/06* | (2006.01) |
| *H04L 12/24* | (2006.01) |
| *G06F 9/445* | (2006.01) |

(52) U.S. Cl.
CPC ............. *H04L 41/0803* (2013.01); *G06F 8/61* (2013.01); *G06F 8/62* (2013.01); *H04L 41/0813* (2013.01); *H04L 41/0853* (2013.01); *H04L 41/0886* (2013.01); *H04L 63/08* (2013.01); *G06F 9/44505* (2013.01); *H04L 63/083* (2013.01)

(58) Field of Classification Search
CPC .. H04L 41/0803; H04L 41/0813; H04L 63/08; H04L 63/083; H04L 41/0886; H04L 41/0853; G06F 8/61; G06F 8/62; G06F 9/44505

USPC .......................................... 726/5, 22, 20, 26
See application file for complete search history.

(56) References Cited

U.S. PATENT DOCUMENTS

| | | | | |
|---|---|---|---|---|
| 6,199,204 | B1 * | 3/2001 | Donohue ................. | G06F 8/65 705/59 |
| 6,425,126 | B1 * | 7/2002 | Branson .................... | G06F 8/65 707/999.202 |
| 7,085,783 | B1 * | 8/2006 | Ito .......................... | G06Q 30/02 705/26.8 |
| 7,197,466 | B1 * | 3/2007 | Peterson ............... | G06F 21/105 705/59 |
| 7,356,679 | B1 * | 4/2008 | Le ..................... | G06F 17/30067 707/E17.01 |
| 7,373,544 | B2 * | 5/2008 | Guzman ................. | H04L 29/06 370/216 |

(Continued)

FOREIGN PATENT DOCUMENTS

| | | |
|---|---|---|
| GB | 2452802 A | 3/2009 |
| GB | 2505436 A | 3/2014 |

(Continued)

*Primary Examiner* — David Garcia Cervetti
(74) *Attorney, Agent, or Firm* — EIP US LLP

(57) ABSTRACT

According to examples described herein computer devices coupled to a network can be automatically configured. Systems information is gathered from a plurality of computer devices by way of one or more of an agent and a scout. This information is standardized and stored in one or more databases. A program function is determined from the standardized information. This program function is used to identify two different sets of computer programs installed on a set of networked computer devices. This configuration is then replaced by a configuration where only a single common computer program is used to perform the program function.

13 Claims, 7 Drawing Sheets

(56) References Cited

U.S. PATENT DOCUMENTS

| | | | |
|---|---|---|---|
| 7,430,590 B1* | 9/2008 | Rive | H04L 29/06 709/203 |
| 7,620,707 B1* | 11/2009 | Sutherland | G06F 8/65 709/202 |
| 7,739,282 B1* | 6/2010 | Smith | H04L 67/22 707/661 |
| 7,895,573 B1* | 2/2011 | Bhargava | G06F 21/554 717/120 |
| 7,925,635 B1* | 4/2011 | Ravulur | G06F 11/3423 705/52 |
| 8,200,794 B1* | 6/2012 | Sutherland | H04L 41/046 709/222 |
| 8,504,665 B1* | 8/2013 | Sutherland | H04L 41/00 709/202 |
| 8,527,979 B2* | 9/2013 | Wookey | G06F 8/68 717/169 |
| 8,799,431 B2* | 8/2014 | Pabari | G06F 9/5072 709/220 |
| 9,213,534 B2* | 12/2015 | Brehm | G06F 8/61 |
| 2001/0013024 A1* | 8/2001 | Takahashi | G06F 21/10 705/59 |
| 2001/0029534 A1* | 10/2001 | Spinks | G06F 21/105 709/224 |
| 2002/0100036 A1* | 7/2002 | Moshir | G06F 8/62 717/173 |
| 2003/0023963 A1* | 1/2003 | Birkholz | G06F 8/65 717/172 |
| 2003/0120624 A1* | 6/2003 | Poppenga | G06F 9/4411 |
| 2003/0135474 A1 | 7/2003 | Circenis et al. | |
| 2005/0125509 A1* | 6/2005 | Ramachandran | G06F 8/61 709/220 |
| 2005/0132349 A1* | 6/2005 | Roberts | G06F 8/65 717/168 |
| 2005/0146966 A1* | 7/2005 | Kawamura | G06F 21/10 365/222 |
| 2006/0074884 A1* | 4/2006 | Sawashima | G06F 17/30864 |
| 2006/0077189 A1* | 4/2006 | Merrison | G06F 8/65 345/179 |
| 2006/0080656 A1* | 4/2006 | Cain | G06F 8/65 717/174 |
| 2006/0123022 A1* | 6/2006 | Bird | G06F 17/30601 |
| 2007/0016531 A1* | 1/2007 | Boomershine | G06F 21/105 705/59 |
| 2007/0022315 A1* | 1/2007 | Comegys, II | H04L 12/24 714/4.2 |
| 2007/0043860 A1* | 2/2007 | Pabari | G06F 9/5072 709/224 |
| 2007/0078702 A1* | 4/2007 | Tandon | G06Q 10/06375 705/7.37 |
| 2007/0233782 A1* | 10/2007 | Tali | G06F 8/61 709/203 |
| 2007/0234343 A1* | 10/2007 | Gouge | G06F 21/51 717/174 |
| 2007/0240151 A1* | 10/2007 | Marl | G06F 8/61 717/174 |
| 2008/0046880 A1* | 2/2008 | Jun | G06F 8/61 717/173 |
| 2008/0148253 A1* | 6/2008 | Badwe | G06F 21/10 717/174 |
| 2008/0189326 A1* | 8/2008 | Norrie | G06F 8/60 |
| 2008/0201705 A1* | 8/2008 | Wookey | G06F 8/68 717/175 |
| 2008/0228814 A1 | 9/2008 | Raley | |
| 2008/0301640 A1* | 12/2008 | Keum | G06F 8/60 717/120 |
| 2008/0307089 A1* | 12/2008 | Sullivan | H04L 41/06 709/224 |
| 2008/0307318 A1* | 12/2008 | Sullivan | H04L 41/20 715/748 |
| 2008/0313325 A1* | 12/2008 | Sullivan | H04L 41/0806 709/224 |
| 2008/0318564 A1* | 12/2008 | Kreiner | G08C 17/02 455/420 |
| 2009/0006307 A1* | 1/2009 | Wolf | G06F 17/30106 |
| 2009/0158438 A1* | 6/2009 | Pichetti | G06F 21/10 726/26 |
| 2009/0164201 A1* | 6/2009 | Celli | H04L 41/20 703/21 |
| 2009/0222461 A1* | 9/2009 | Alpern | G06F 17/30233 |
| 2010/0057905 A1 | 3/2010 | Enscoe et al. | |
| 2010/0058313 A1 | 3/2010 | Hansmann | |
| 2010/0125657 A1 | 5/2010 | Dowling et al. | |
| 2010/0242037 A1* | 9/2010 | Xie | G06F 8/61 717/178 |
| 2010/0250730 A1* | 9/2010 | Menzies | G06F 21/105 709/224 |
| 2010/0318989 A1* | 12/2010 | Dureau | G06F 9/4443 717/178 |
| 2011/0113493 A1* | 5/2011 | Moore | G06F 21/105 726/30 |
| 2011/0225405 A1* | 9/2011 | Lyons | G06F 9/4406 713/2 |
| 2011/0231288 A1 | 9/2011 | Crisan | |
| 2012/0081754 A1* | 4/2012 | Kitada | G06F 17/30289 358/1.18 |
| 2012/0089625 A1* | 4/2012 | Bentzien | G06F 17/30359 707/756 |
| 2012/0096455 A1* | 4/2012 | Katsumata | G06F 9/45558 717/177 |
| 2012/0304248 A1* | 11/2012 | Watts | G06Q 30/06 726/1 |
| 2012/0324468 A1* | 12/2012 | Slater | G06F 9/52 718/104 |
| 2013/0013614 A1 | 1/2013 | Mayo | |
| 2013/0019316 A1* | 1/2013 | Kacin | G06F 21/105 726/26 |
| 2013/0042227 A1 | 2/2013 | Little et al. | |
| 2013/0054492 A1* | 2/2013 | Boudreau | G06Q 10/063 705/400 |
| 2013/0080511 A1* | 3/2013 | Majka | G06F 17/30109 709/203 |
| 2013/0124463 A1* | 5/2013 | Lee | G06F 17/30575 707/610 |
| 2013/0139139 A1* | 5/2013 | Mallur | G06F 8/65 717/170 |
| 2013/0139183 A1* | 5/2013 | Mallur | G06F 8/63 719/321 |
| 2013/0332303 A1* | 12/2013 | Schank | G06Q 30/0641 705/26.4 |
| 2013/0332323 A1* | 12/2013 | Phillips | G06K 9/00771 705/28 |
| 2014/0025796 A1* | 1/2014 | Vibhor | H04L 41/0889 709/222 |
| 2014/0039982 A1* | 2/2014 | Oberhagemann | G06Q 50/184 705/7.35 |
| 2014/0089274 A1* | 3/2014 | Gocek | G06F 17/30312 707/692 |
| 2014/0101061 A1* | 4/2014 | Boudreau | G06F 21/10 705/317 |
| 2014/0280436 A1* | 9/2014 | Larkin | G06F 9/4843 709/201 |
| 2014/0298420 A1* | 10/2014 | Barton | H04L 63/10 726/4 |
| 2015/0032887 A1* | 1/2015 | Pesek | G06F 21/305 709/224 |
| 2015/0089473 A1* | 3/2015 | Gocek | G06F 8/70 717/120 |
| 2015/0193215 A1* | 7/2015 | Jianu | G06F 8/61 717/177 |
| 2015/0278293 A1* | 10/2015 | Swierk | G06F 17/30392 726/23 |
| 2015/0347487 A1* | 12/2015 | Cohan | G06F 17/30342 726/4 |

(56) References Cited

U.S. PATENT DOCUMENTS

2015/0372981 A1\* 12/2015 Cohan ................ H04L 63/0263
                                                                455/410

FOREIGN PATENT DOCUMENTS

| WO | 2007/050215 A1 | 5/2007 |
| WO | 2008/049772 A2 | 5/2008 |

\* cited by examiner

CONFIGURATION OF NETWORK DEVICES

CROSS-REFERENCE TO RELATED APPLICATIONS

This application claims priority under 35 U.S.C. §119 to GB Patent Application No. GB1319182.0, filed Oct. 30, 2013, which is hereby incorporated by reference in its entirety.

BACKGROUND OF THE INVENTION

Field of the Invention

The present invention relates to configuring computer devices that are communicatively coupled to one or more computer networks. In particular, the present invention relates to determining a configuration of a plurality of such computer devices by monitoring the operation of each device.

Description of the Related Technology

Nearly all modern organizations use some form of computer network. For example, an exemplary organization may own or lease a plurality of computer devices that may be connected to one or more internal local area networks. In organizations that span multiple locations one or more local area networks may be communicatively-coupled to form one or more wide area networks. Nearly all organizations are also normally in some way communicatively coupled to the largest of wide area networks: the Internet.

The computer devices that make up a computer network are often heterogeneous. For example, a computer network may comprise desktop computers, mobile devices, tablets, server computers, network-attached storage etc. Even within a set of desktop computers, computer architectures, ages and features may vary. For example, desktop computers may be added as an organization expands and/or operating system upgrades may be applied in a haphazard manner. When organizations merge or restructure, previously distinct sets of computer devices may also be communicatively-coupled to a common network. This often leads to a plurality of computer devices with different configurations being connected to one or more networks controlled by an organization.

Having a plurality of computer devices with different configurations communicatively coupled to a common network can cause a variety of problems. These can be security and/or operational problems. For example, if different operating system patches are applied to different sets of computer devices then they may experience difficulties communicating with each other and/or provide security weaknesses that may be exploited by malicious parties. The larger the organization the bigger these problem become. A network of computers can be very large with hundreds or more computer devices on the network, each with one or more software packages. Additionally, computer programs or operating system functions that require access to a local or wide-area network may compete for limited bandwidth. For example, a plurality of networked computer devices may access data and/or functions hosted on a remote server. If each computer device has a different configuration it can be difficult to control remote access and message exchanges may be unnecessarily duplicated.

US 2013/0013614 A1 describes how a catalogue of standardized identifiers may be used to identify software installed on computer devices coupled to a network. Data relating to the use of the software may also be obtained and associated with the identification data. The usage data together with the standardized identifiers allows managers to more reliably manage software on the network. For example un-used software may be un-installed.

SUMMARY

In accordance with a first embodiment of the present invention, there is provided a server computer device comprising: a network interface arranged to communicatively couple the server computer device to at least one network, the server computer device being communicatively coupled to a plurality of computer devices via said at least one network; an identification and usage processor comprising: a system information interface arranged to receive a first set of data indicative of computer programs installed on said plurality of computer devices and a second set of data indicative of usage of said programs; a catalogue database interface arranged to communicatively couple the identification and usage processor to a catalogue database, the catalogue database comprising a plurality of identification records associated with a plurality of known computer programs, each identification record being indexed by a standardized program identifier; a standardization component arranged to process the data received via the system information interface and convert said data into a set of standardized program identifiers that correspond to the standardized program identifiers in the catalogue database; an installation database interface arranged to communicatively couple the identification and usage processor to an installation database, the installation database comprising a plurality of installation records, each installation record being associated with a standardized program identifier and a computer device identifier; an installation component arranged to output installation data indicative of one or more computer programs that are installed on each of the plurality of computer devices based on the output of the standardization component, the installation data being stored as installation records in the installation database by way of the installation database interface; a usage database interface arranged to communicatively couple the identification and usage processor to a usage database, the usage database comprising a plurality of usage records, each usage record being associated with at least a standardized program identifier; a correlation component arranged to correlate the second set of data with the standardized program identifiers output by the standardization component and output usage data to be stored as usage records in the usage database by way of the usage database interface; a program function analyzer arranged to determine, based on one or more of data in the installation database and data in the usage database as accessed via a respective one or the installation database interface and the usage database interface, at least one common program function that is implemented by a first computer program on a first subset of the plurality of computer devices and by a second computer program on a second subset of the plurality of computer devices; and a configuration component to instruct un-installation of a selected one of said first computer program or said second computer program on a respective one of said first subset or said second subset of computer devices and to instruct installation of the other of said first computer program or said second computer program, such that the first subset of computer devices and the second subset of computer devices are configured with a common computer program to perform said at least one common program function.

In accordance with a second embodiment of the present invention, there is provided a server computer device comprising: a network interface, wherein the server computer device is a second server computer device and the network interface is arranged to communicatively couple the server computer device to a first server computer device, the first server computer device being communicatively coupled to a plurality of computer devices via said at least one network; a systems management processor comprising: data identifying a plurality of further server computer devices that are communicatively coupled to the second server computer device; one or more scout components arranged to parse said data identifying each of the plurality of further server computer devices and communicate with each further server computer device indicated in the data, each scout component being arranged to obtain, using system information from each of the further server computer devices, a first set of data indicative of computer programs installed on each further server computer device and a second set of data indicative of usage of said programs on each further server computer device; and a data interface communicatively coupled to one or more scout components and a systems information database, the data interface being arranged to store data received from the one or more scout components in the systems information database, wherein the data interface is further communicatively coupled to an interface of the first server computer device via the network interface, the data interface being arranged to receive a request for data from the first server computer device and in response provide data from the systems information database.

In accordance with a third embodiment of the present invention, there is provided a computer-implemented method of determining a configuration of a plurality of computer devices that are communicatively coupled to at least one network, the method comprising: accessing a first set of data identifying one or more computer programs installed on each of the plurality of computer devices; mapping the first set of data to a set of one or more standardized program identifiers; accessing a second set of data identifying usage of one or more computer programs on each of said plurality of computer devices; correlating the second set of data with the set of one or more standardized program identifiers; and based on at least one of the first and second sets of data, determining at least one program function that is implemented on at least a subset of the plurality of computer devices.

In accordance with a fourth embodiment of the present invention, there is provided a computer-implemented method of obtaining systems information from a plurality of server computer devices that are communicatively coupled to at least one network for use in configuring said devices, the method comprising: accessing, on a systems management server, data identifying each of the plurality of server computer devices; parsing, on the systems management server, the accessed data to determine an address of each server computer device on the at least one network; communicating, from the systems management server, with each server computer device using a corresponding one of the determined addresses, said communicating comprising querying each server computer device for systems information, the systems information comprising a first set of data indicative of computer programs installed on each server computer device and a second set of data indicative of usage of said programs on each server computer device; receiving, at a data interface of the systems management server, data from each of the plurality of server computer devices, the data comprising said systems information, and storing the data in a database; receiving, at the data interface of the systems management server, a request from an identification and usage server, the request being received at predetermined time intervals and relating to systems information for the plurality of server computer devices stored in the database; retrieving, at the systems management server, data from the database; and sending, via the data interface of the systems management server, the retrieved data to the identification and usage server, wherein the identification and usage server uses the sent data to determine at least one common program function that is implemented by a first computer program on a first subset of the plurality of server computer devices and by a second computer program on a second subset of the plurality of server computer devices Further features and advantages of the invention will become apparent from the following description of embodiments of the invention, given by way of example only, which is made with reference to the accompanying drawings.

DETAILED DESCRIPTION OF CERTAIN INVENTIVE EMBODIMENTS

Example Computer Network

Figure 1A:
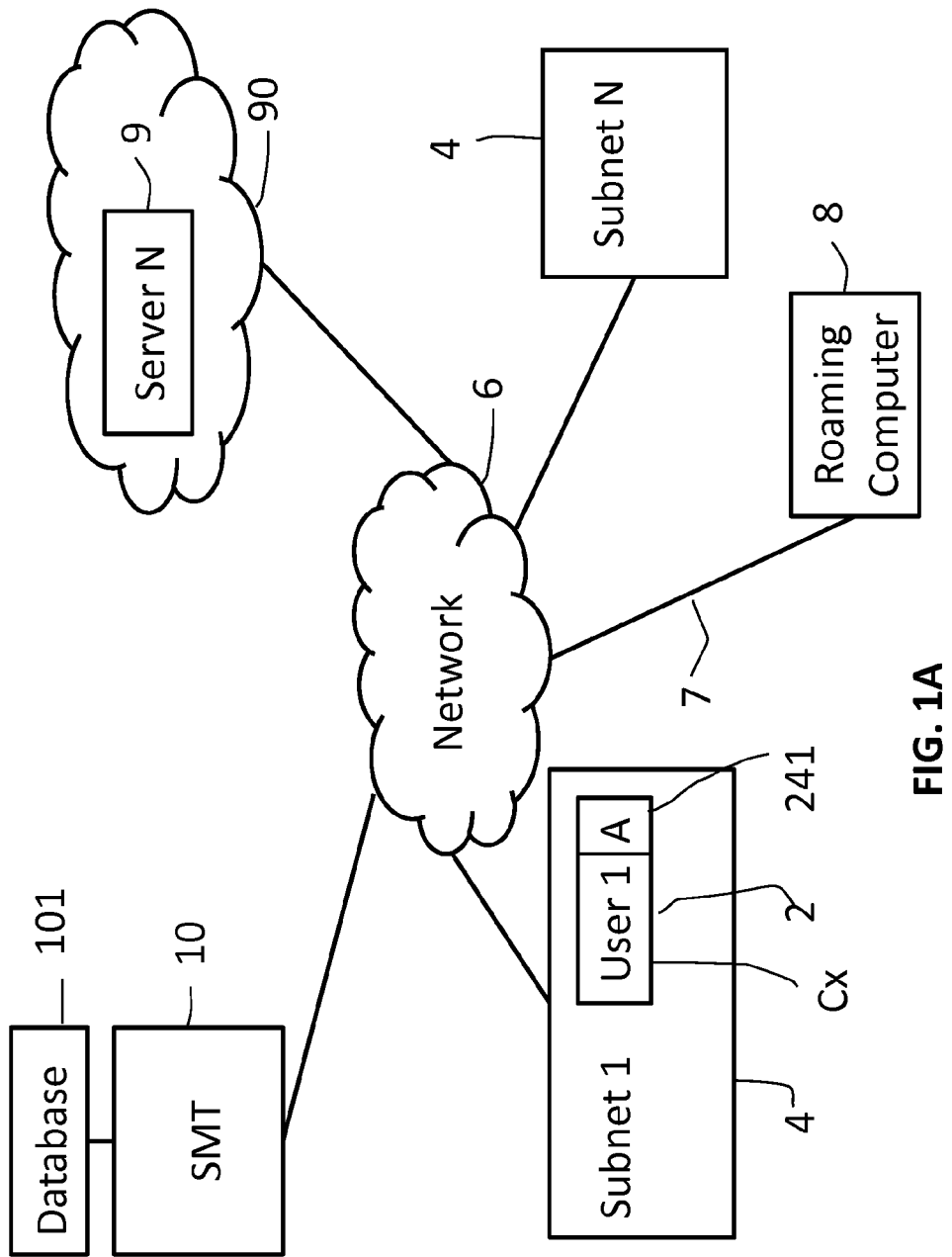
FIG. 1A is a schematic block diagram of a computer network in which the present invention may be implemented.
Figure 1B:
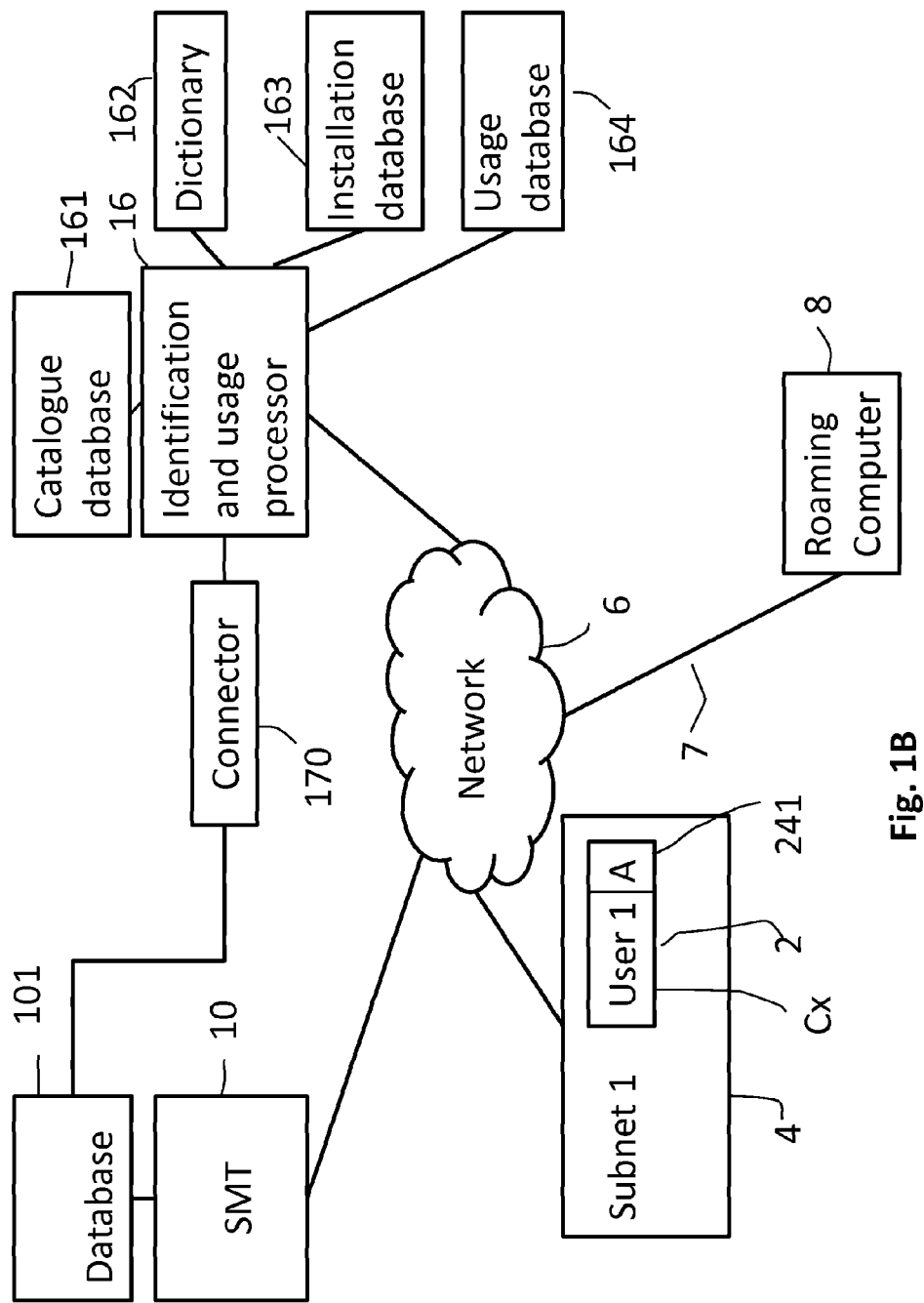
FIG. 1B is a schematic block diagram of a first set of components within the computer network of FIG. 1A.
Figure 1C:
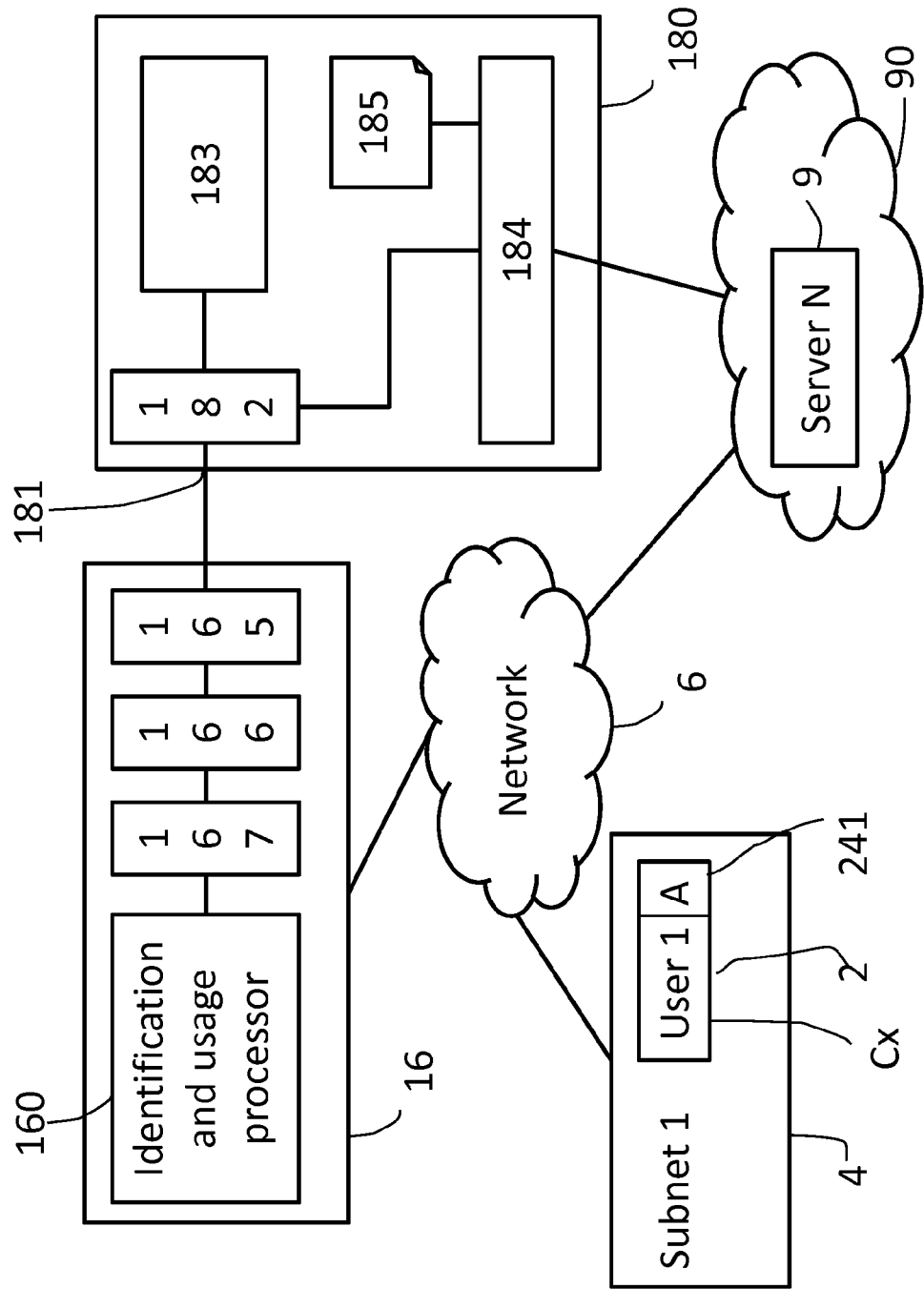
FIG. 1C is a schematic block diagram of a second set of components within the computer network of FIG. 1A.

Embodiments of the invention will be described by way of example with reference to a computer network as shown in FIGS. 1A to 1C. Each of FIGS. 1A to 1C shows certain components that may be communicatively coupled to form a computer network. Each Figure is not exhaustive, certain components are shown to help explain the examples described herein. The components that are provided for any particular implementation will depend on the requirements of the implementation; certain components may be added, removed or modified while still providing functionality described herein. For example, in one implementation all the components illustrated in FIGS. 1A to 1C may be provided as part of a common network; in another implementation, the components of FIG. 1C may be provided without certain components of FIG. 1B.

FIG. 1A shows components that may exist as part of a computer network. The network of FIG. 1A may be a private network associated with an organization. The organization may be an "enterprise" as referred to in the art, e.g. a public or private company, charity or public body. The network of FIG. 1A may be usable only by people authorized by the organization. This may be controlled by security systems, for example access control functions implemented by an operating system and/or network programs.

In FIG. 1A, a plurality of computer devices 2, 8, 9 are communicatively-coupled to a communications network symbolized at 6. Certain computer devices 2 may be on subnets 4, e.g. form one or more groups with a common internet protocol address portion. There may be a plurality of subnets as illustrated in FIG. 1A. Some computer devices 8 may be roaming away from the network 6. For example, the network 6 may be linked to another network via a further network coupling 7. This other network may comprise the Internet for example. Computer devices 8 owned or managed by the organization may roam and use the Internet to connect to the network 6 or connect to it in other ways, for example via a Virtual Private Network (VPN). Some computer devices may comprise server computer devices 9 that are provided as part of a server "cloud" 90, i.e. a plurality of server computer devices 9. Server computer devices 9 may comprise physical computer devices or virtual computer devices, e.g. one server rack may host a large number of virtual server instances, where each server instance acts as if it is an individual computer device. Similarly, any of the other computer devices 2, 8 may also comprise virtualized instances. Server computer devices may also host database management systems, i.e. may comprise a database server. For example, a database server may comprise an Oracle® or SQL server.

Gathering Data from the Network

According to examples described herein, information is gathered that describes the configuration of one or more computer devices communicatively coupled to the network 6. When a computer network comprises heterogeneous devices there is the problem of accurately collecting data regarding the network. This problem is solved by one or more of the present examples.

According to the present examples, information may be gathered by one or more agents that operate upon one or more respective computer devices and/or one or more scouts that obtain information by remotely interacting with one or more computer devices. In one implementation a single scout may monitor a plurality of server and/or desktop computer devices. Comparatively, in most implementations each computer device that uses an agent to obtain data has one agent instance operating on the computer device. In certain cases, one or more scouts are arranged to retrieve data collected by one or more agents.

In one implementation that uses agents, the network comprises a systems management tool (SMT) 10. This is illustrated in FIGS. 1A and 1B. An example of such a tool is a Configuration Manager, also formerly known as Systems Management Server (SMS), provided by Microsoft Corporation. Other companies also provide systems management tools. The systems management tool 10 has a database 101 storing data relating to the configuration of the network. The systems management tool 10 is arranged to manage computer devices 2, 8 communicatively coupled to the network 6. For example, the systems management tool may be arranged to provide: remote control, patch management, software distribution, operating system deployment, network access protection and hardware and software inventory. The systems management tool may be arranged to manage computer devices 2, 8 with a variety of operating systems including, but not limited to: Windows, Windows Embedded, Mac OS X, Linux or UNIX, as well as various mobile operating systems such as Windows Phone, Symbian, iOS and Android.

In another implementation that uses agents, the network may not comprise a systems management tool and/or the examples described herein may not make use of such a tool. In these implementations an agent may directly provide data to one or more server computer devices as described in the following passages.

Example Agent

An example of an agent that may be used with at least a subset of computer devices will now be described. In a typical implementation, an agent is installed on a client computer device, e.g. a desktop computer device; however, in certain implementations an agent may be installed on a server computer device. Versions of an agent are also available for mobile computer devices. An agent A is shown in FIGS. 1A to 1C as being installed on computer device 2.

In the example shown in FIGS. 1A and 1B, the systems management tool 10 uses agents A on the computers 2, 8 which report regularly to the systems management tool 10. An agent A may comprise a systems management client, such as a Configuration Manager Client provided by Microsoft Corporation or another client program. In other examples, the agents A may report to a computer device other than the systems management tool 10. As described above, an agent A may be installed on any type of computer device, including desktop, mobile and server devices; as will be understood, the agents A may have different implementations for different computer devices and/or operating systems.

An agent A may comprise one or more client agent components to respectively identify and configure one or more of:

A hardware inventory;
A software inventory;
Available software for installation;
Active software;
Available software updates;
Remote management; and
Network access.

A hardware inventory component may be arranged to collects a wide variety of data about a computer device running the agent A. For example, this may comprise data describing computer hardware such as processor specifications, memory specifications and coupled input/output devices. The hardware inventory component may access information stored in a Windows Management Instrumentation (WMI) repository of the computer device. The Windows Management Instrumentation repository stores information obtained from components of the computer device, such as performance data, error information and trace or log files. For example, a hard disk drive may report errors and average access times. The hardware inventory component may access information such as registry keys. In operating systems other than Windows, data may be obtained by inspecting configuration files (e.g. in a "/prod/" folder on a computer device running Linux) and/or by storing the output of one or more configuration tools (e.g. "lshw"—list hardware).

A software inventory component may be configured to inventory, e.g. scan and record, a number of files stored within a storage device coupled to the computer device. The storage medium typically comprises a hard disk drive and/or flash storage. In one case, the software inventory client agent component may be configured to access program manager information, such as a list of installed programs. The operating system may provide an application programming interface (API) to retrieve this information, e.g. to access and return registry and/or configuration file information. In other cases, the information may be accessed directly from one or more configuration files (e.g. as may be the case in a Linux or UNIX system).

An available software component may configure sources of software, e.g. packages or installation files that are downloadable over the network 6. An installer (not shown), for example Microsoft Installer, may be used for installing computer programs on computer devices of the network or computer programs may be installed by users directly on their computers. Alternatively a package manager may be used to install software. The agents A detect software however it is installed.

An active software component may be arranged to monitor which software is run on the computer device, i.e. which of one or more computer programs are processed by the computer device. It may gather data detailing one or more of: program usage, program users, program start time, and a length of time a program is used. Monitoring of software may comprise monitoring executable programs. An executable program is a compiled program that has been translated into computer code in a format that can be loaded into memory of the computer device and run by a processor of the computer device. A mapping may be provided to map a name of an executable program to a program name. For example, an executable programs may have ".exe" or ".com" file name extension in a Windows operating system environment (although the active software component may be configured to monitor executable programs with other file name extensions or file names that have been renamed). When a user activates an executable program, e.g. clicks on a shortcut to an executable file, the operating system manages the running of that program and the active software component has access to executable file information such as file name, file version, and file size and the program's start time and end time. This information may be accessed by way of the operating system (e.g. via an application programming interface provided by the operating system) or another program that controls processes on the computer device. For example, on a computer device running the Windows operating system, the information may be similar to that displayed by the Windows Task Manager component.

In one case the software inventory component may operate in a complementary manner to the active software component for static files. For example, the software inventory component may be arranged to locate executable files that are stored on a storage device regardless of whether they are run. The software inventory component may collect information such as file size, time of last access, time of creation, user permissions etc. This information may be provided by way of a file system implemented by the operating system, e.g. using a tool and/or application programming interface provided by the operating system.

In one case, an agent A may obtain data indicating installed software on a Windows desktop computer device by parsing registry information such as HKEY_LOCAL_MACHINE\SOFTWARE\Microsoft\ Windows\CurrentVersion\Uninstall. This lists programs that may be uninstalled, i.e. programs that have been installed on the computer device and registered with the operating system (e.g. using Microsoft Installer). Data may alternatively or additionally be obtained by scanning for the existence of executable files on a storage device. An agent A may be arranged to scan a set of configurable locations, such as all child directories of folder "ProgramFiles" in a Windows system or its equivalents (e.g. "/opt/" in certain Linux and UNIX systems). When an executable file is located, installation data may be extracted from an information block of metadata associated with the file (e.g. in a particular section of binary data comprising the file). An installation date may also be determined based on a modified date of the executable file. For a computer device using a Linux operating system a package manager may be configured to export a list of installed programs, for example as a log file.

In one case, monitoring active software by the agent A may comprise monitoring a process using a combination of WMI notifications (on classes Win32_ProcessStartTrace and Win32_ProcessStopTrace) and polling a list of running processes using Win32 API EnumProcesses. In this case, a list of returned processes may be filtered based on executable file location, e.g. processes whose executable file resides in a folder on a configurable list of folders may be ignored.

In the example of FIGS. 1A and 1B, an agent A on a computer device 2, 8 reports obtained information to the systems management tool 10. This information may comprise data obtained by one or more of the components described above. Information may be reported at set time intervals, e.g. according to a configurable "push" time schedule and/or reported in response to a request from the systems management tool 10, e.g. according to a configurable "pull" time schedule. In certain cases, data may be stored (e.g. cached) locally on the computer device 2, 8 until a reporting time and/or until a network connection to the systems management tool 10 is available. On receipt, systems management tool 10 stores the obtained data in database 101. In other implementations, the agent A may report on a similar basis to a server device that is not the systems management tool 10.

Identifying Computer Device Configuration

In the example of FIG. 1B, the data received by systems management tool 10 and stored in database 101 is used by an identification and usage processor 16 to accurately identify one or more computer programs that are installed and/or in use on each computer device. Identification and usage processor 16 is required because of the problems described in US 2013/0013614 A1: the data collected by certain agents A and/or stored in database 101 is "noisy", i.e. contains variations, errors and inaccuracies. For example, it is conventionally expected that program names, as stored as strings within the database 101, conform to a predefined pattern such as publisher, product name and version identifier, for example "Microsoft Office Standard 201010.0". However in reality this is not the case; much data does not conform to a predefined pattern. This may be because a program may have a different name depending on factors such as geographical location, program source (e.g. CD-ROM or download), version or release number, and/or programmer error. This creates difficulties in identifying the installation and/or use of computer programs on a computer device, for example determining what data entries in fact relate to a common functional program.

In certain implementations, rather than report to systems management tool 10, each agent A may send data to identification and usage processor 16. This may be necessary where it is not possible and/or practical to install a systems management server and set of clients. In this case, each agent A may directly send data collected as described above the identification and usage processor 16 for processing and storage in an appropriate coupled database. In this case, systems management tool 10, database 101 and connector 170 may not be provided.

For the purposes of identifying computer programs installed on computer devices of the network, the identification and usage processor 16 accesses "noisy" identification data derived from the database 101 of the systems management tool 10 and applies a mapping process to map the noisy data to standardized identifiers stored in a catalogue database 161. The mapping establishes a catalogued identifier for each item of noisy data and this identifier is stored in an installation database 163 associated with the identification and usage processor 16 as installation data. For example, installation database 163 may store at least a pairing (e.g. a tuple) between a computer device identifier and a catalogued identifier. In certain cases a plurality of catalogued identifiers may be associated with a computer device identifier thus indicating in an accurate manner computer programs installed on the computer device. By using such mapping, a coherent and consistent set of software identification data is created. This mapping is described in more detail in described in US 2013/0013614 A1.

In one case, the identification and usage processor 16 is communicatively coupled to a usage database 164. The usage database 164 comprises a plurality of usage records, each usage record being associated with at least a standardized program identifier. In one case a correlation component of the identification and usage processor 16 is arranged to correlate usage data with the standardized program identifiers output by the standardization component and to output usage data to be stored as usage records in the usage database. For example, this may comprise totaling usage times for a plurality of different program names that are mapped to a common standardized program identifier. Both the installation and usage databases may be accessed by the identification and usage processor via an appropriate database interface.

In one case, there is a problem of accessing identification data derived from database 101. For example, database 101 may not provide a standardized interface to access the data stored therein. In this case, a connector 170 is used to extract data from the database 101 and supply it to the identification and usage processor 16.

Example Scout

For a server computer device, a scout may be used as well as, or instead of an agent A, to determine one or more of a hardware inventory, a software inventory, available software for installation, active software, available software updates, a remote management configuration and a network access configuration as described above. The information gathered by the scout may be comparable to that gathered by an agent A. Typically a scout is used to gather systems information associated with server computer devices 9. An example of a system to implement a scout is described below with reference to FIG. 1C.

FIG. 1C shows a systems management processor 180 that is communicatively coupled to the identification and usage processor 16. In one case, a network interface 181 couples the systems management processor 180 to the identification and usage processor 16, however in other cases another direct or indirect coupling may be used. Further, although not shown in FIG. 1C for clarity, the systems management processor 180 may be coupled to the identification and usage processor 16 via the network 6, i.e. both the identification and usage processor 16 and the systems management processor 180 are coupled to, and communicate via, network 6. In FIG. 1C, the identification and usage processor 16 is adapted to communicate with the systems management processor 180. As such the identification and usage processor 16 comprises an interface 165 for communicatively coupling the identification and usage processor 16 to the network interface 181 of the systems management processor 180. The identification and usage processor 16 further comprises an integrator 166 arranged to receive systems information from the systems management processor 180 and instruct the processing of said data by a core component 160 of the identification and usage processor 16. The core component 160, for example, performs the standardization function described above. Coupled to the core component 160 and the integrator 166, the identification and usage processor 16 comprises a synchronizer 167 arranged to synchronize the activity of the integrator 166 at predefined time intervals. For example, the synchronizer 167 may instruct the integrator 166 to collect data from the systems management processor 180 on a daily basis.

FIG. 1C also shows a number of components of the systems management processor 180. In this FIG. 1C there is a data interface 182 communicatively coupled to a systems information database 183 and one or more scout components 184. The data interface 182 may comprise an API arranged to be accessed over a network, which in certain cases may comprise the Internet. In these latter cases the systems management processor 180 may be remote from the identification and usage processor 16, e.g. the illustrated coupling in FIG. 1C may not be routed via network 6 (or routed via network 6 as much as is necessary to access one or more external networks). The data interface 182 is arranged to store data received from the one or more scout components 184 in the systems information database 183.

The one or more scout components 184 are arranged to parse data identifying each of a plurality of server computer devices 9, e.g. each server computer device 9 in "cloud" 90. In FIG. 1C, the data identifying the plurality of server computer devices 9 comprises a text-based list 185 of server computer device names and/or network addresses. In one case, only a name of the server computer device is required; this name may identify the server computer device on the network 6 and/or within the "cloud" 90. In one case, a name may be a hostname that is mapped to an Internet Protocol (IP) address that identifies the server computer device on the network 6, or the IP address itself.

Each scout component 184 is arranged to communicate with a server computer device as set out in the server list 185. Each scout component 184 is arranged to obtain, using system information from each server computer device 9, systems information similar to that obtainable by the agents A as described above. For example, this systems information may comprise at least one of a first set of data indicative of computer programs installed on each server computer device and a second set of data indicative of usage of said programs on each server computer device.

For certain server computer devices, such as those running an operating system based on UNIX or Linux, the one or more scout components 184 may comprise one or more secure shell sub-components for securely communicating with these devices. Each secure shell sub-component may have access to a configuration file listing authentication credentials for each UNIX or Linux-based server computer device. These credentials may comprise a username and password and/or a cryptographic key. Each secure shell sub-component is arranged to perform a remote command-line login using a set of authentication credentials from the configuration file and query a server computer device for systems information using one or more remote command-line commands.

For other server computer devices, such as those running an operating system based on Windows, the one or more scout components 184 may comprise one or more a remote registry sub-component arranged to perform one or more Windows Management Instrumentation queries on a subset of the server computer devices. For example, these queries may comprise a remote version of the agent queries described in the passages above. In this case, each of the subset of server computer devices is configured to receive an authorized request from the remote registry sub-component. This may involve setting the IP address of the systems management server 180 as an authorized IP address for accessing systems information on a server computer device.

In the described examples only one scout component and/or sub-component need be required. However, the process of obtaining systems information may be accelerated by using a plurality of components and/or sub-components operating as a number of server processes in parallel. Both Windows-based and UNIX or Linux-based server computer devices may be scanned in by a common scout component 184 that is arranged to appropriately use each of the secure shell sub-component and the remote registry sub-component. For example, the server list 185 may comprise data indicative of the type of operating system used by each server computer device in the list, which may be used to select an appropriate sub-component.

In use, systems information similar to that obtainable by the agents A is collected by the one or more scout components 184 and is stored in the systems information database 183. The data interface 182 of the systems management processor 180 is arranged to receive a request for data from the interface 165 of the identification and usage processor 16 and in response provide data from the systems information database 183. The interface 165 may then pass received data to the integrator 166. The integrator 166 may instruct the standardization of program names in the received data and the storage and/or update of records in the installation database 163. Similarly, the integrator 166 may instruct the correlation of usage data in the received data and the storage and/or update of records in the usage database 164.

Example Computer Device Architecture

Figure 2:
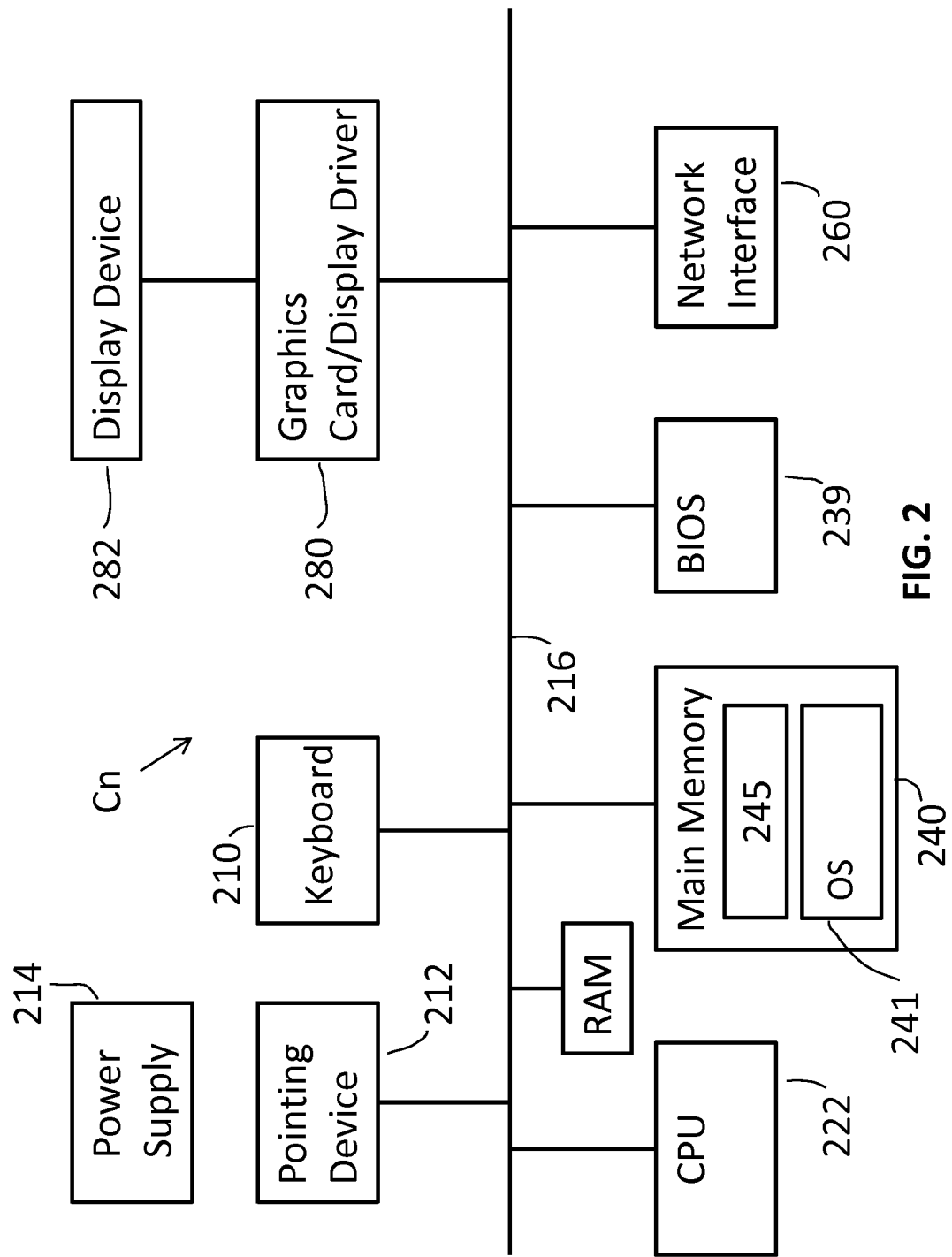
FIG. 2 is a schematic block diagram of a computer device usable in the network of FIG. 1.

The systems management tool 10 and/or the identification and usage processor 16 are computer devices. Referring to FIG. 2, an illustrative computer device, including computers 2, 8 and/or 9 of the network is shown. In this case, the computer device comprises amongst other components: a Read Only Memory 239 storing a BIOS, a central processing unit (CPU) 222 having a Random Access Memory RAM; a main memory 240 for example a hard disk drive or other storage device, for example electronic memory; and a network interface 260. It may also comprise a display driver 280 coupled to a display device 282; one or more human interface devices or input devices for example a keyboard 210 and a pointing device 212; and one or more busses 216; The network interface couples the computer to other computers C1 to Cm having respective IP addresses. The computer also comprises a power supply 214. In use, programs 245 are stored in the main memory 240 and executed by the CPU 222 with access to the RAM. The computer of FIG. 2 has an operating system stored in the main memory, together with one or more additional components that operate with, and at the level of, the operating system 241. For example, in the case of one set of computer devices the one or more additional components may comprise an agent A.

Program Function

In embodiments of the present invention, a program function is a discrete set of features that provide a specific technical functionality. A program function may be considered as a particular configuration of a computer device, e.g. the computer device in question is configured such that it can perform a particular function by way of a combination of software and hardware. A program function may represent creation of computer data, a state change in a computer device or access of particular hardware and/or network devices. A program function is implemented by a particular computer device by way of computer program code; for example, by way of executable code that is stored in memory and processed by one or more processors. The computer program code may form part of an operating system and/or one or more application programs. In many computer devices, a combination of an operating system and an application program provides a function. For certain computer platforms, such as Linux or UNIX or mobile operating systems, there may be no clear dividing line between system functions provided by an operating system kernel and system functions provided by additional installable programs. A function is represented by a function identifier and is independent of an underlying implementing program. For example, one function may be data backup, e.g. generating a duplicate copy of data stored on one or more storage devices that are coupled to, or form part of, a computer device. Numerous programs may perform an equivalent "data backup" function, even if particular implementations vary. Further examples of program functions include, for example and without limitation, the ability to open a specific document format (e.g. Portable Document Format—PDF—files), the ability to process images (e.g. display Portable Network Graphics—PNG—files), the ability to export data of a particular type (e.g. create eXtended Markup Language—XML—files), the ability to access particular input/output devices (e.g. write data to a tape drive), the ability to encrypt documents, and the ability to change document formats.

In accordance with an example, identification and usage processor 16 and catalogue database 161 are arranged to identify one or more program functions that are performed by a particular computer device. To achieve this the catalogue database 161 is arranged to store one or more function identifiers. Each function identifier may be associated with one or more catalogued identifiers. For example, at least a tuple pairing a catalogued identifier and a function identifier may be stored. In one example, the catalogue database also includes, in association with the identifiers of program functions, criteria for detecting use of the program functions.

Hence, an adapted catalogue database 161 provides standardized program function identifiers. Different software produced by different producers may have the same program functions. In this manner, even if the same program function is provided by different versions of the same software, or by different software, it is identified by one consistent identifier.

Example Catalogue

Figure 3:
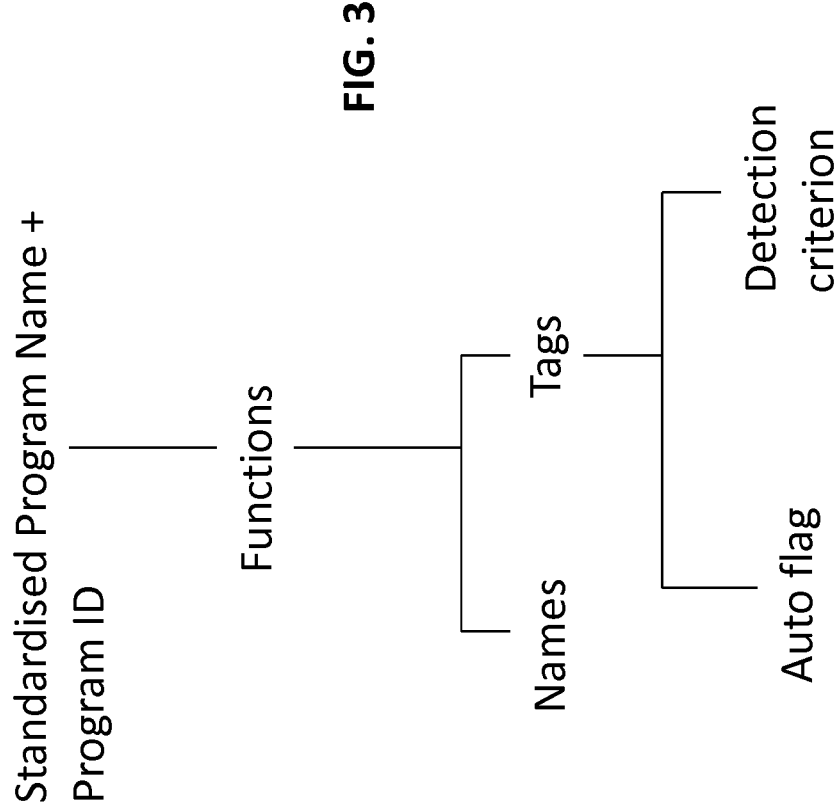
FIG. 3 is a diagram showing by way of example a possible organization of data in a catalogue of FIG. 2 in accordance with an example.

FIG. 3 shows an example of configuration data included in the catalogue database 161. In this example, the catalogue database 161 includes a standardized program name and a corresponding program identifier. Associated with a program identifier are one or more function identifiers. For example, in a relational database a link record may have a field to store a program identifier and a field to store an associated function identifier. Each function identifier may then associated with a program function name and one or more tags. In the example of FIG. 3, the one or more tags comprise an "auto flag" and one or more detection criteria by which use of the program functions can be detected. The "auto tag" in this example indicates whether a program function may be detected automatically. The one or more detection criteria comprise a data definition indicating a pattern by which a function may be automatically detected.

A program function identifier may be associated with a program identifier in a number of ways. In a first case, a function identifier may be applied by processing documentation associated with a program. For example, a "read me" file or manual may be parsed and the text therein mapped to a predefined program function. In a second case, a program function may be known for one or more programs. In this case, a configuration signature may be generated based on information extracted from database 101. For example, a particular software and/or hardware configuration as recorded by agent A may be correlated with a particular program identifier. Portions of the configuration data that provide the correlation, e.g. strongly correlated data fields or principal components, may be identified and marked as a configuration signature. Values of these fields may then be inspected for other computer devices to determine if they exceed one or more thresholds indicating another correlation. If a correlation exists based on data from another computer device but the computer device is not associated with the particular program identifier, then the function identifier is associated with computer device. Data detailing the use of programs may then be processed to determine a temporal correlation between one or more programs installed on the computer device and the configuration signature. Where a temporal correlation is detected, e.g. a use of a particular program is always present when the particular configuration signature is present, then the particular program is associated with the program function. In certain cases, this process may be applied in a statistical manner across a plurality of computer devices coupled to the network 6 to associate one or more program function identifiers with a plurality of program identifiers.

Method of Program Function Identification

Figure 4:
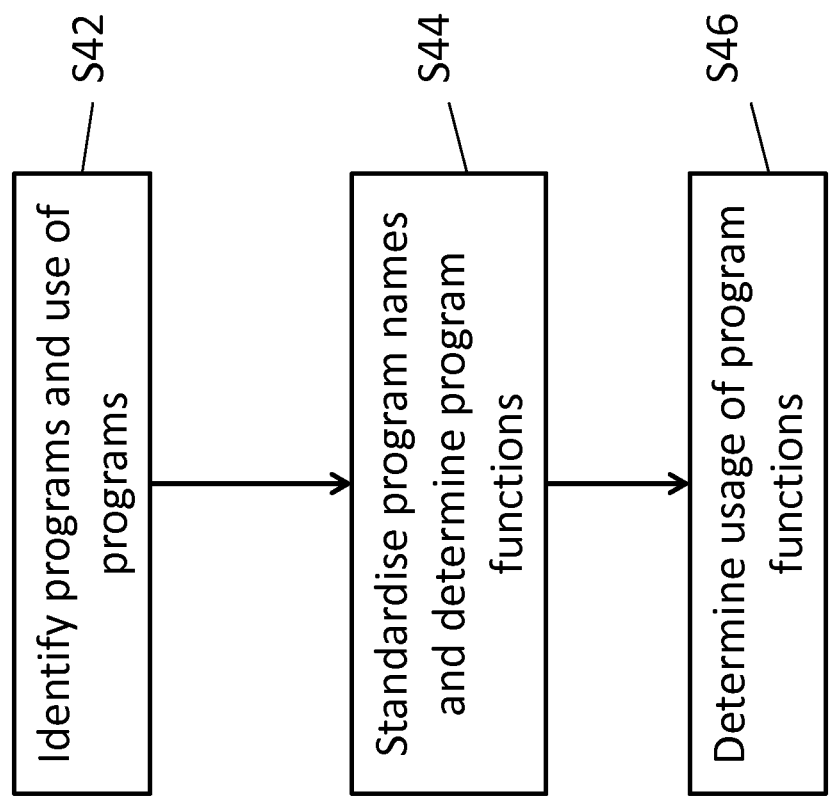
FIG. 4 is a flow chart of a method, in accordance with an example, of analyzing usage of program functions of a group of computers.

Referring to FIG. 4, the following steps S42, S44 and S46 are carried out automatically by the identification and usage processor 16. The method may be repeated for each of a plurality of computer devices coupled to the network.

At step S42, one or more computer programs that are installed on a selected computer device are identified. To do this the identification and usage processor 16 may access data in database 101 via database connector 170. Access may occur during or prior to step S42. The data in database 101 may be collected by way of systems management tool 10 and an agent A, the agent A being operational on the selected computer device. Usage of one or more computer programs may also identified from data provided by the systems management tool 10 and the agent A. In one case, data is provided by way of one or more of a software inventory component and an active software component.

At step S44, the identification and usage processor 16 standardizes the names of programs identified at step S42. Standardization may be performed as described in US 2013/0013614 A1. An output of standardization is a set of program identifiers. Once these have been determined, the identification and usage processor 16 additionally determines one or more program functions associated with the computer device. This may comprise retrieving one or more link records indexed by the determined program identifiers and then processing these link records to extract one or more program function identifiers. An output of step S44 may comprise a list of one or more program functions that are operational on the computer device.

At step S46, the identification and usage processor 16 additionally correlates usage data of one or more programs to determine usage of one or more program functions. For example, usage data collected by way of systems management tool 10 and an agent A may be extracted from database 101 via connector 170. This usage data may be associated with "noisy" data indicating one or more programs. After this "noisy" data is mapped onto one or more standard program identifiers, the usage data is processed to also associate it with said standard program identifiers. This may comprise consolidating usage data for a plurality of "noisy" data items that are mapped onto a single standard program identifier. The identification and usage processor 16 is then able to associate usage data with one or more program function identifiers, for example via the link record described above. An output of step S46 may comprise a set of values representing program functions and the usage of those functions. For example, a row in a table of values may comprise: "Data Backup: 00:02:18" indicating that a data backup program function has been used for 2 hours 18 minutes in a predefined time period.

The method of FIG. 4 is repeated for a plurality of computer devices 2, 8 on network 6. This may generate a list of program functions and network-wide usage data, e.g. a program function of "Word Processing" may be used by 8 out of 10 computer devices for more than 15 hours a week. The results may also indicate what proportion of computer devices use a particular program to perform a particular program function, e.g. 4 computers may use the program "Microsoft Word" and 4 computers may use the program "LibreOffice Writer". Those skilled in the art will understand that a variety of data may be obtained using the described methods and that only a few examples are described herein.

In certain cases, computer devices may be assigned to one or more groups. These groups may be configured by a network manager and may comprise, amongst others, computer devices on a particular subnet, computer devices within a particular geographical location and/or computer devices within one or more access control groups. Similarly computer devices may be grouped based on data identifying one or more users of the computer device; for example, computer devices may be grouped based on users within a particular access control group. As such a computer device with multiple users may belong simultaneously to a plurality of groups. Program and program function inventories, as well as program and program function usage, may thus be defined for these groups. This may be used when configuring a plurality of computer devices as described in more detail below.

Configuring Computer Devices

The data obtained by one or more of the agents A and scout components 184 as herein described is used in one example to configure computer devices coupled to the network 6. Amongst others, these computer devices may comprise one or more of client and server computer devices.

In one case the identification and usage processor 16 comprises a program function analyzer. The program function analyzer is arranged to determine, based on one or more of data in the installation database 163 and data in the usage database 164 at least one common program function that is implemented by a first computer program on a first subset of the plurality of computer devices and by a second computer program on a second subset of the plurality of computer devices. For example, a program function may comprise "virus scan". One set of computer devices may use an operating system based virus scanner whereas another set of computer devices may use a third-party virus scanner. The computer programs that implement each virus scanner may be identified by a standardized program identifier. As such a list of computer devices that are associated with each standardized program identifier may be obtained. Having two different virus scanners operational on the network 6 presents a security risk. For example, the two computer programs may use different virus definitions, as such one computer virus may be detected on one set of computer devices but not detected on another set of computer devices. Additionally, virus definition updates and system scans may be configured differently on each computer program, leading to inconsistencies that could be exploited by a malicious party.

The present examples overcome the problem described above by providing a configuration component to instruct un-installation of a selected one of said first computer program or said second computer program on a respective one of said first subset or said second subset of computer devices and to instruct installation of the other of said first computer program or said second computer program, such that the first subset of computer devices and the second subset of computer devices are configured with a common computer program to perform said at least one common program function. The configuration component may comprise part of the identification and usage processor 16. In this case, one of the virus scanners discussed above may be automatically removed and replaced with the virus scanner that is already in use on another set of devices. This reduces the security risks described above.

The configuration component may instruct installation and/or uninstallation in a number of ways. For both Windows-based and UNIX or Linux-based computer devices a command-line tool may be used. For Windows-based computer devices this tool may comprise the Windows Management Instrumentation Command-Line; for UNIX or Linux-based computer devices it may comprise a secure shell. One or more commands may be instructed using the command-line tool to install and/uninstall computer programs. In another example, one or more remote commands to a program and/or package manager may be instructed.

In another case, a common computer program may be installed to replace an uninstalled computer program that previously performed a common program function by way of higher risk operations. For example, one computer program may allow remote access via specific network ports while another computer program may block such functionality. If both computer programs perform a common program function the latter computer program is preferred to reduce the security risks on the network. Similarly a computer program that supports a high level of encryption may be preferred to a computer program that only supports a lower level of encryption. In another case, a computer program that minimizes disk usage may be preferred to a computer program that requires large files to be stored on a computer device. Having a common computer program across a network to perform a program function also facilitates updates and upgrades—for example, only a single update server need be authorized at a network firewall and it can be ensured that all computer devices will be updated when a periodic update is released. In a previous case, the update of different computer programs may occur at different times, this may lead to difficulties in network communication, e.g. different versions of a computer program may use different data formats. With the present examples, after all computer devices have been updated to a common computer program an update can be performed in relation to these devices.

The present examples may also automatically locate out-of-date programs, e.g. if it is determined that a small subset of computer devices are using a different computer program to the majority of devices to perform a common program function. Out-of-date or older programs may be less efficient and may not be supported by more recent operating systems. This can lead to more errors or "computer crashes" on this small subset of devices. The present examples allow this out-of-date software to be automatically located and replaced. This can also reduce the number of patches that need to be applied to older programs.

In accordance with the examples described herein computer devices on a network may be automatically configured with minimal human interaction. This configuration is accurate and consistent and can be achieved across heterogeneous computer devices.

Variation

Figure 5:
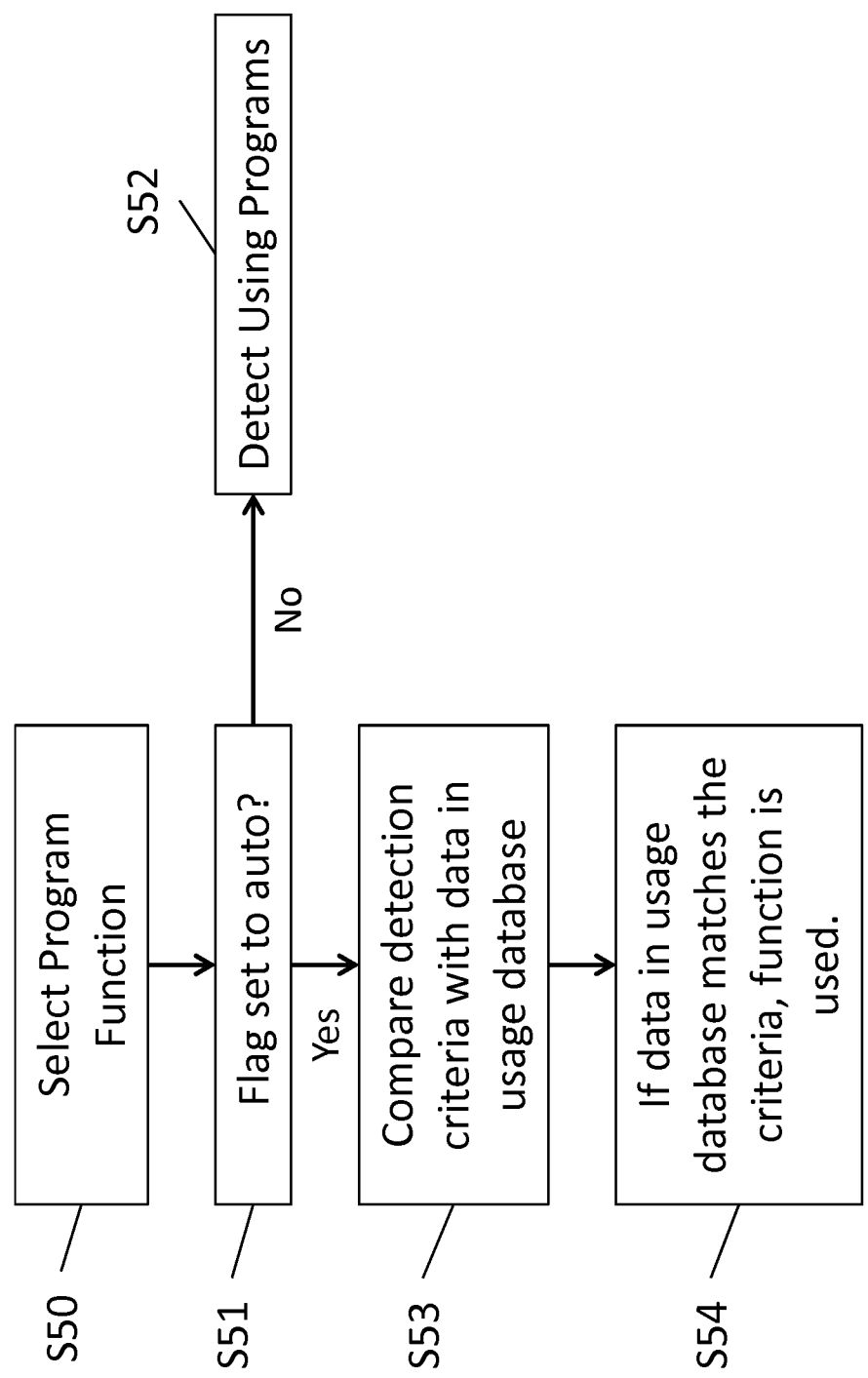
FIG. 5 is a flow chart of a method, in accordance with a variation, of automatically identifying program functions.

A variation of the present examples will now be described. In this variation, program functions are detected independently of programs. FIG. 5 shows this variation, which automatically detects program functions that are used on a computer device 2, 8.

At step S50, a particular program function is selected. This program function may comprise one of a plurality of program functions. At step S51 it is determined whether the setting an auto-flag associated with the selected function is set to true, i.e. that the function may be detected automatically. An auto-flag is only one or a number of possible ways to indicate that a function may be detected automatically and other methods and/or data structures may be used in different implementations.

If the auto-flag indicates automatic detection is not possible then a program function may be detected by way of a correlation with detected programs as described above at step S52. If the auto-flag indicates automatic detection is possible, then the detection criteria for that function are retrieved in step S92. The detection criteria may then be applied to data in the usage database 164 at step S53.

The detection criteria include, by way of example, (and without limitation):

Writing files with specific file types (ability to create .pdf files for example);

Changes to files;

Changes to registry values; and

Access to specific network addresses/ports/uniform resource locators (URL)s.

As indicated at step S54, if the criteria for detecting use of a function match the corresponding data in the usage database, then the function is deemed to be used. This determination may be made based on usage data for a specific computer device and/or for usage data aggregated over all computer devices coupled to the network 6.

Examples as described herein may be implemented by a suite of computer programs which when run on one or more computer devices of the network. For example, a computer program run on a server computer device may implement the usage and identification processor 16 and as such implement the process of steps S32 to S36 of FIG. 4 and/or steps S51 to S54 in FIG. 5. This provides an efficient technical implementation that is easy to reconfigure; however, other implementations may comprise a hardware-only solution or a mixture of hardware devices and computer programs. For example, some server computer devices may have bespoke hardware modules for reporting usage data. In one case, different entities may provide different aspects of the examples; for example, the identification and usage process may be implemented by an entity different to that which manages the network and/or provides the systems management tool. Likewise, monitoring of the usage of software on one or more computer devices and/or the gathering of data relating to use of functions is typically performed by one or more computer programs implemented on one or more computer devices that communicate over the network 6 with other computer programs on other computer devices. One or more computer programs that are supplied to implement the invention may be stored on one or more carriers, which may also be non-transitory. Examples of non-transitory carriers include a computer readable medium for example a hard disk, solid state main memory of a computer, an optical disc, a magneto-optical disk, a compact disc, a magnetic tape, electronic memory including Flash memory, ROM RAM, a RAID or any other suitable computer readable storage device.

The term "software" as used herein refers to any tool, function or program that is implemented by way of computer program code. In use, an executable form of the computer program code is loaded into memory (e.g. RAM) and is processed by one or more processors. As such the term "software" includes, without limitation: —an operating system; application programs; patches for, and updates of, software already installed on the network; and new software packages.

The following description refers to databases. The term "database" is used in the general sense of a collection of data stored in a data store. A database described herein by way of ease of description as a single database may be a set of different data tables from which the relevant data is derived.

As used herein, Windows® and Microsoft® are registered trademarks of Microsoft Corporation, Linux® is the registered trademark of Linus Torvalds in the U.S. and other countries and UNIX® is a registered trademark of The Open Group. The registered trademark symbol ® has been omitted for clarity but is implied. Other registered trademarks are identified by the symbol ® in situ. In one implementation the identification and usage processor may comprise an implementation of an AppClarity® server as provided by 1E Limited. In one implementation the systems management processor may comprise an implementation of an ActiveEfficiency® server as provided by 1E Limited.

The above examples are to be understood as illustrative. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention, which is defined in the accompanying claims.

What is claimed is:

1. A server computer device comprising:
    a network interface arranged to communicatively couple the server computer device to at least one network, the server computer device being communicatively coupled to a plurality of computer devices via said at least one network;
    an identification and usage processor comprising:
        a system information interface arranged to receive a first set of data indicative of computer programs installed on said plurality of computer devices and a second set of data indicative of usage of said programs;
        a catalogue database interface arranged to communicatively couple the identification and usage processor to a catalogue database, the catalogue database comprising a plurality of identification records associated with a plurality of known computer programs, each identification record being indexed by a standardised program identifier;
        a standardisation component arranged to process the data received via the system information interface and convert said data into a set of standardised program identifiers that correspond to the standardised program identifiers in the catalogue database;
        an installation database interface arranged to communicatively couple the identification and usage processor to an installation database, the installation database comprising a plurality of installation records, each installation record being associated with a standardised program identifier and a computer device identifier;
        an installation component arranged to output installation data indicative of one or more computer programs that are installed on each of the plurality of computer devices based on the output of the standardisation component, the installation data being stored as installation records in the installation database by way of the installation database interface;
        a usage database interface arranged to communicatively couple the identification and usage processor to a usage database, the usage database comprising a plurality of usage records, each usage record being associated with at least a standardised program identifier;
        a correlation component arranged to correlate the second set of data with the standardised program identifiers output by the standardisation component and output usage data to be stored as usage records in the usage database by way of the usage database interface;
        a program function analyser arranged to determine, based on one or more of data in the installation database and data in the usage database as accessed via a respective one or the installation database interface and the usage database interface, at least one common program function that is implemented by a first computer program on a first subset of the plurality of computer devices and by a second computer program on a second subset of the plurality of computer devices; and
        a configuration component to instruct un-installation of a selected one of said first computer program or said second computer program on a respective one of said first subset or said second subset of computer devices and to instruct installation of the other of said first computer program or said second computer program, such that the first subset of computer devices and the second subset of computer devices are configured with a common computer program to perform said at least one common program function.

2. The server computer device of claim 1 wherein the server computer device comprises a first server computer device and the system information interface comprises:
    an interface for communicatively coupling the first server computer device to a second server computer device;
    an integrator arranged to receive the first and second sets of data and instruct the processing of said data by the identification and usage processor; and
    a synchroniser arranged to synchronise the activity of the integrator at predefined time intervals.

3. The server computer device of claim 1, wherein the systems information interface is arranged to receive data from a plurality of client computer devices communicatively coupled to said at least one network, wherein each client computer device comprises systems information comprising data indicative of said one or more computer programs that are installed on the client computer device and an agent arranged to obtain said data from the systems information, the agent further being arranged to obtain data indicative of executable files that are executed on the client computer device, wherein the configuration component of the server computer device is arranged to instruct configuration of a subset of the plurality of client computer devices.

4. The server computer device of claim 3, wherein the systems information interface is arranged to receive data from a systems management server communicatively coupled to the plurality of client computer devices via said at least one network, the systems management server being arranged to receive data from each of the plurality of agents and a systems management database arranged to store the data received from said agents, wherein the server computer device comprises a connector to extract the first and second sets of data via the system information interface.

5. The server computer device of claim 1, wherein the systems information interface is arranged to receive data from a plurality of further server computer devices communicatively coupled to said at least one network, each further server computer device comprising systems information comprising one or more of data indicative of said one or more computer programs that are installed on the client computer device and data indicative of usage of said computer programs, wherein the configuration component of the server computer device is arranged to instruct configuration of a subset of the plurality of further server computer devices.

6. A computer-implemented method of determining, at an identification and usage processor comprising at least a processor and a memory, a configuration of a plurality of computer devices that are communicatively coupled to at least one network, the method comprising:
    accessing a first set of data identifying one or more computer programs installed on each of the plurality of computer devices;
    mapping the first set of data to a set of one or more standardised program identifiers;
    accessing a second set of data identifying usage of one or more computer programs on each of said plurality of computer devices;
    correlating the second set of data with the set of one or more standardised program identifiers;
    based on at least one of the first and second sets of data, determining at least one program function that is implemented on at least a subset of the plurality of computer devices;
    determining a first computer program that is providing the determined program function for a first subset of said plurality of computer devices;
    determining a second computer program that is providing the determined program function for a second subset of said plurality of computer devices;
    selecting one of the first computer program or the second computer program to provide the determined computer function;
    responsive to selecting the first computer program, instructing the un-installation of the second computer program on each of the computer devices in the second subset, and instructing the installation of the first computer program on each of the computer devices in the second subset; and
    responsive to selecting the second computer program, instructing the un-installation of the first computer program on each of the computer devices in the first subset, and instructing the installation of the second computer program on each of the computer devices in the first subset.

7. The method of claim 6, wherein, prior to at least one of accessing the first set of data and accessing the second set of data, the method comprises:
    accessing a list of server computer devices;
    querying each server computer device in the list for at least hardware and software inventory information; and
    storing data received from each server computer device in response to the query step in a database,
    wherein at least one of mapping the first set of data and correlating the second set of data comprises:
    at synchronised time intervals, retrieving data from the database using a database connector; and
    processing the retrieved data, and
    wherein at least one of accessing the first set of data and accessing the second set of data comprises accessing the processed data.

8. The method of claim 6, wherein, prior to at least one of accessing the first set of data and accessing the second set of data, the method comprises:
    on each of a plurality of client computer devices, accessing system information;
    on each of said plurality of client computer devices, transmitting at least a portion of the accessed system information to a server computer device;
    receiving, at the server computer device, the transmitted information;
    processing the received information at the server computer device; and
    storing the received information in a database,
    wherein at least one of accessing the first set of data and accessing the second set of data comprises retrieving system information for the plurality of client computer devices from the database.

9. The method of claim 6, comprising:
    applying a program update to the selected one of the first computer program or the second computer program on each computer device.

10. The method of claim 6, wherein determining at least one program function that is implemented on at least a subset of the plurality of computer devices comprises:
    using a standardised program identifier derived from the first set of data to retrieve an associated program function identifier,
    wherein the step of mapping the first set of data is performed for each computer device to obtain one or more standardised program identifiers corresponding to each computer device,
    wherein one or more program function identifiers are retrieved for each of the plurality of computer devices, and
    wherein a plurality of program function identifiers corresponding to the plurality of computer devices are processed to determining a particular program function that is implemented on at least a subset of the plurality of computer devices.

11. The method of claim 6, wherein a program function has associated data that defines one or more criteria for the detection of the program function and determining at least one program function that is implemented on at least a subset of the plurality of computer devices comprises:

applying said criteria to at least one or more of the first set of data and the second set of data.

12. The method of claim 6, wherein at least one of the first set of data and the second set of data comprise one or more of:
   data extracted from a system registry of a computer device;
   data extracted from a configuration file of a computer device;
   data provided by an installation manager of a computer device;
   data provided by a Windows Management Instrumentation application programming interface;
   data resulting from a file system scan of one or more storage devices accessible to a computer device; and
   data provided by a monitor component arranged to monitor the execution of executable files.

13. A computer-implemented method of obtaining systems information from a plurality of server computer devices that are communicatively coupled to at least one network for use in configuring said devices, the method comprising:
   accessing, on a systems management server, data identifying each of the plurality of server computer devices;
   parsing, on the systems management server, the accessed data to determine an address of each server computer device on the at least one network;
   communicating, from the systems management server, with each server computer device using a corresponding one of the determined addresses, said communicating comprising querying each server computer device for systems information, the systems information comprising a first set of data indicative of computer programs installed on each server computer device and a second set of data indicative of usage of said programs on each server computer device;
   receiving, at a data interface of the systems management server, data from each of the plurality of server computer devices, the data comprising said systems information, and storing the data in a database;
   receiving, at the data interface of the systems management server, a request from an identification and usage server, the request being received at predetermined time intervals and relating to systems information for the plurality of server computer devices stored in the database;
   retrieving, at the systems management server, data from the database; and
   sending, via the data interface of the systems management server, the retrieved data to the identification and usage server,
   wherein the identification and usage server uses the sent data to determine at least one common program function that is implemented by a first computer program on a first subset of the plurality of server computer devices and by a second computer program on a second subset of the plurality of server computer devices; and
   the identification and usage server instructs un-installation of the first computer program on the first subset of server computer devices and instructs installation of the second computer program on the same first subset of server computer devices, such that at least a subset of the plurality of server computer devices are configured with a common computer program to perform said at least one common program function.

* * * * *